United States Patent [19]

Hanson et al.

[11] Patent Number: 5,982,746
[45] Date of Patent: *Nov. 9, 1999

[54] BROADBAND DIGITAL CROSS-CONNECT SYSTEM ARCHITECTURE

[75] Inventors: Gary D. Hanson, Plano; Michael H. Jette, Grapevine; Neil E. Glassie, Lewisville; Mike M. Tatachar, Allen, all of Tex.

[73] Assignee: Alcatel USA, Inc., Plano, Tex.

[*] Notice: This patent is subject to a terminal disclaimer.

[21] Appl. No.: 09/128,353

[22] Filed: Aug. 3, 1998

Related U.S. Application Data

[63] Continuation of application No. 08/548,583, Oct. 26, 1995, Pat. No. 5,790,519.

[51] Int. Cl.$^6$ ............................... H04J 1/16; H04L 12/50
[52] U.S. Cl. ............................................ 370/220; 370/387
[58] Field of Search ...................................... 370/218, 219, 370/220, 353, 358, 360, 367, 387, 388, 422, 396, 465, 217, 375, 376, 377, 378, 380, 420, 535; 359/117, 128, 139, 147, 135

[56] References Cited

U.S. PATENT DOCUMENTS

| | | | |
|---|---|---|---|
| 4,394,541 | 7/1983 | Seiden | 179/18 GE |
| 4,862,161 | 8/1989 | Schomers | 340/825.8 |
| 4,914,429 | 4/1990 | Upp | 340/825.8 |
| 5,091,903 | 2/1992 | Schrodi | 370/58.1 |
| 5,214,640 | 5/1993 | Sakurai et al. | 370/60 |
| 5,237,565 | 8/1993 | Henrion et al. | 370/60.1 |
| 5,263,121 | 11/1993 | Melsa et al. | 395/22 |
| 5,295,134 | 3/1994 | Yoshimura et al. | 370/16 |
| 5,390,178 | 2/1995 | Hunter | 370/63 |
| 5,414,706 | 5/1995 | Muhr | 370/65.5 |
| 5,436,890 | 7/1995 | Read et al. | 370/58.2 |
| 5,479,608 | 12/1995 | Richardson | 370/217 |

FOREIGN PATENT DOCUMENTS

| | | | |
|---|---|---|---|
| 9518514 | 7/1995 | WIPO | H04Q 11/04 |

OTHER PUBLICATIONS

Berlin, et al., "Alcatel 1641 SX synchronous digital cross–connect", Commutation et Transmission, vol.17, No. 2, Jan. 1, 1995, pp. 35–44.

Kalvonjian, et al., "VLSI Applications in Switching Systems Current Applications and Trends in Technology Evolution", Proceedings of the International Switching Symposium, vol. 1–2, Oct. 25–30, 1992, pp. 246–250.

Bergkvist, et al., "Flexnode—ein digitales Cross–Connect System", NTZ Nachrichten Technische Zeitschrift, vol. 44, No. 10, Oct. 1, 1991, pp. 702–710.

Aboaf, et al., "1644 SX: répartiteur numérique synchronie á 155 mbits/s", Commutation et Transmission, vol. 15, No. 1, Jan. 1, 1993, pp. 29–40.

PCT Search Report, dated Jan. 24, 1997.

*Primary Examiner*—Huy D. Vu
*Assistant Examiner*—Chiho Andrew Lee
*Attorney, Agent, or Firm*—Baker & Botts, L.L.P.

[57] ABSTRACT

A small broadband cross-connect system (10) includes a two-stage matrix (12) for processing and cross-connecting optical and electrical telecommunication network signals. An administration subsystem (14) provides centralized control and synchronization to the two-stage matrix (12). The two-stage matrix (12) may be expanded from 96 ports to 192 ports in a cost and space effective manner.

17 Claims, 2 Drawing Sheets

BROADBAND DIGITAL CROSS-CONNECT SYSTEM ARCHITECTURE

CROSS-REFERENCE TO RELATED APPLICATIONS

This application is a continuation of U.S. application Ser. No. 08/548,583 filed Oct. 26, 1995 by Gary D. Hanson, Michael H. Jette, Neil E. Glassie, and Mike M. Tatachar and entitled "Broadband Digital Cross-Connect System Architecture," now U.S. Pat. No. 5,790,519, issued Aug. 4, 1998.

TECHNICAL FIELD OF THE INVENTION

The present invention relates in general to telecommunications switching systems and more particularly to a cost effective broadband cross-connect system and architecture.

BACKGROUND OF THE INVENTION

Digital cross-connect systems are an integral part of today's modern telecommunications transport network. They are increasingly used by all service providers including exchange carriers, long distance carriers, and competitive by-pass carriers. Significant technology advancements have allowed digital cross-connect systems to evolve from narrowband grooming and test applications to cross-connection of larger network signals in wideband and broadband frequency domains.

A broadband system is typically used to terminate high speed SONET optical and electrical signals in order to path terminate and groom lower speed broadband signals. The broadband system also supports performance monitoring and test access functions. Typical broadband cross-connect systems use either single stage or three stage Clos matrix architecture. In the three stage matrix architecture, the cross-connect includes switches grouped into an originating stage, a center stage, and a terminating stage. The three stage matrix architecture is best suited for maximum capacity applications for cross-connecting a large volume of signals. The single stage matrix architecture organizes the single stage matrices in rows and columns, which results in a higher number of switches than the three stage architecture.

For an application that requires a small capacity cross-connection (48 to 192 ports), the three stage and single stage architecture have proven to be costly and cumbersome. Accordingly, there is a need for a digital cross-connect system that is fully non-blocking, reliable, cost effective, and space efficient.

SUMMARY OF THE INVENTION

In accordance with the present invention, a cross-connect system is provided which substantially eliminates or reduces disadvantages and problems associated with conventional three stage and single stage digital cross-connect systems.

In one aspect of the invention, a small broadband cross-connect system includes a two-stage matrix for processing and cross-connecting optical and electrical telecommunication network signals. An administration subsystem provides centralized control and synchronization to the two-stage matrix. The two-stage matrix may be expanded from 48 ports to 192 ports in a cost and space effective manner.

In another aspect of the invention, the two-stage matrix architecture includes a first high speed unit having first and second crosspoint switches, each cross-connecting signals at STS-1 rate, and a second high speed unit having third and fourth crosspoint switches, each cross-connecting signals at STS-1 rate, the second high speed unit being interconnected with the first high speed unit.

In yet another aspect of the invention, the two-stage matrix may be expanded to include a third high speed unit having fifth and sixth crosspoint switches, each cross-connecting signals at STS-1 rate, and a fourth high speed unit having seventh and eighth crosspoint switches, each cross-connecting signals at STS-1 rate. The first, second, third and fourth high speed unit are interconnected to form the two-stage cross-connect.

A technical advantage of the present invention is the cost and space efficient manner in which a small broadband cross-connect system is constructed. The two-stage matrix architecture is advantageous over conventional single stage and three stage architecture, and is expandable and configurable according to need.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
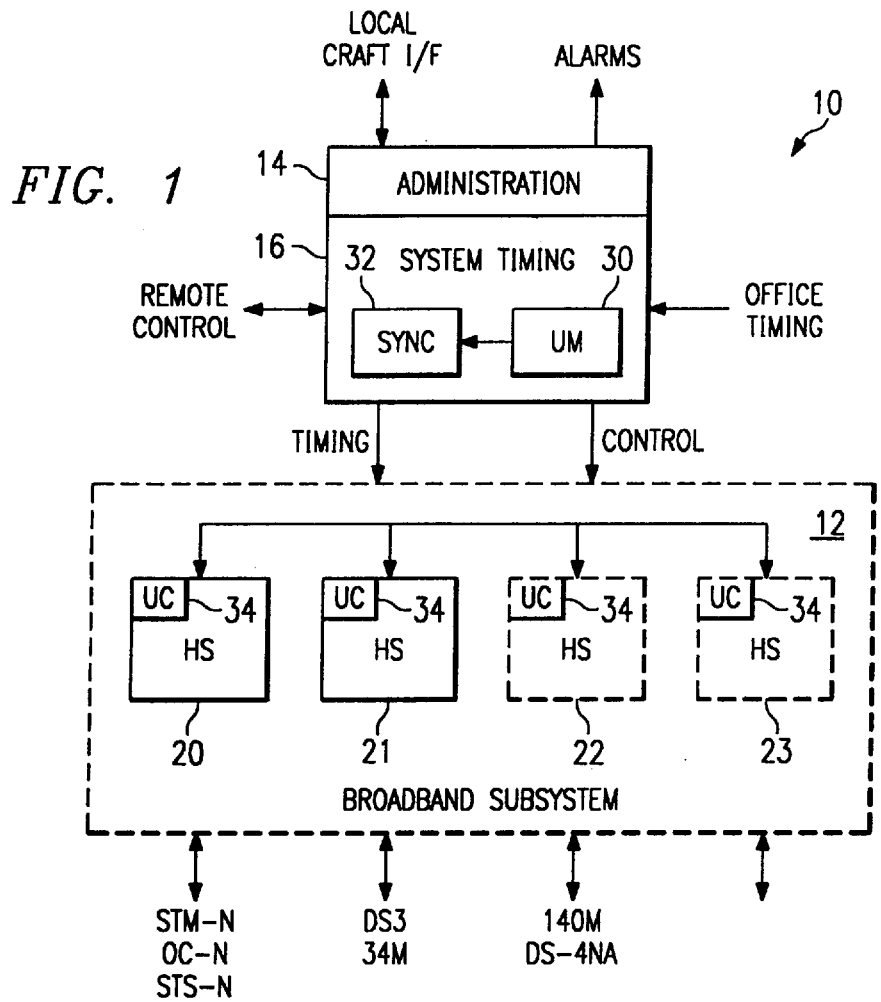
FIG. 1 is an high level block diagram of an embodiment of broadband digital cross-connect system architecture.

FIG. 1 is a simplified block diagram of an embodiment of a broadband digital cross-connect system architecture, generally indicated at reference numeral 10. Broadband cross-connect system 10 includes a broadband subsystem 12, under the control of an administration subsystem 14 and a system timing subsystem 16. Broadband subsystem 12 includes a number of interconnected high speed unit shelves (HS) 20–23, which receive network optical and electrical signals, such as STM-N, OC-N, STS-N, DS3, 34M, 140M, and DS-4NA, for processing and cross-connecting these signals.

Administration subsystem 14 provides control, monitoring, and synchronization to each subsystem within broadband digital cross-connect system 10. Synchronization is performed through a central office standard reference frequency or derived from network signal timing. Administration subsystem 14 further provides communication interfaces to a user and local or remote craft access. Administration subsystem 14 also interfaces with central office discrete signals and provides alarm conditions to the central office alarm systems. Administration subsystem 14 performs intelligent watchdog communications to each processor (not shown), monitors and processes alarm conditions, and controls reset of the processors. Remote alarm surveillance and processing may be accomplished over an E2A serial communications channel. Administration subsystem 14 performs operations, administration, maintenance, and provisioning (OAM&P) functions for broadband digital cross-connect system 10. Administration subsystem 14 may also include redundant processors (not shown) to provide the platform to perform these functions. These processors may interface with central office discrete signals through a serial interface to perform top level monitoring and control for broadband digital cross-connect system 10. Maintenance access to the processors may be accomplished through either a local terminal (not shown) or by remote access through a modem (not shown).

System timing subsystem 16 provides communications and timing functions for broadband digital cross-connect system 10. System timing subsystem 16 receives an office timing source to generate the internal timing for synchronizing broadband subsystem 12. Timing synchronization may also be derived from network signals for distribution to each subsystem. Synchronization and control information are distributed by system timing subsystem 16.

System timing subsystem 16 includes a unit manager 30 which provides a redundant communications and control path between administration subsystem 14 and broadband subsystem 12. Intrasystem control information is sent from administration subsystem 14 to unit manager 30. Unit manager 30 provides intermediate level OAM&P functions. Although not shown, unit manager 30 includes A and B copies that control A and B copies of the broadband matrix, respectively, which are discussed in detail below.

System timing subsystem 16 also includes a synchronizer 32 that accepts a central office timing source and generates the timing signals required for broadband subsystem 12. Unit manager 30 also provides control information to synchronizer 32.

A third tier of the control hierarchy is performed by unit controllers 34 located in each high speed unit shelf 20–23 of broadband subsystem 12. Unit controller 34 controls and monitors functions in associated unit shelves 20–23. Control information transmitted between unit manager 30 and unit controller 34 is carried through direct cabling connections. Redundant unit controllers 34 are located in each high speed unit shelf 20–23. Broadband subsystem 12 may include two unit types—high speed optical (HSO) units or high speed electrical (HSE) units. Broadband subsystem 12 supports network termination of DS-3, STS-1, OC-3, and OC-12 signals as well as international STM-1 termination capability. High speed optical units terminate synchronous optical signals at the OC-3 and OC-12 rates. High speed electrical units provide electrical termination of asynchronous electrical and synchronous electrical signals at the DS-3 and STS-1 rates, respectively. Broadband subsystem 12 also processes section and line overhead fields. Network signals are cross-connected through broadband subsystem 12 through internal STS-1P (proprietary) signals having an STS-1 rate locked to the time base of broadband subsystem 12, but with an alternate use of overhead from standard STS-1 signal processing. Signals are transported through broadband subsystem 12 in STS-1P frames at transport rate of 51.84 Mb/s.

High speed optical and electrical units 20–23 act as interfaces to the network optical and electrical domains, respectively. High speed optical and electrical units monitor the quality of the data streams and provide a protection scheme by switching from a failed channel to a dedicated protection channel upon detection of a degraded signal. High speed optical and electrical units 20–23 also insert and extract overhead data which is used to carry information about the payload and perform communication with other network elements.

Broadband digital cross-connect system 10 uses redundant data paths in coupling each component together to increase operation reliability. Each subsystem is organized in dual independent A and B planes with no cross coupling within the planes. Each unit within each subsystem has access to both planes and is capable of independently selecting an active plane. Thus, a number of failures can be accommodated in both planes without loss of network traffic. The selection of one plane as the "active" plane can be switched to the other plane whenever necessary. The switch is performed in a seamless manner so that the switch is transparent to system functions. Please refer to U.S. Pat. No. 5,436,890, entitled "Integrated Multi-Rate Cross-Connect System" issued to Read et al. on Jul. 25, 1995, and Ser. No. 08/176,125, entitled "Integrated Multi-Fabric Digital Cross-Connect Timing Architecture" filed on Dec. 30, 1993, for a full description on plane swapping, herein incorporated by reference.

Figure 2:
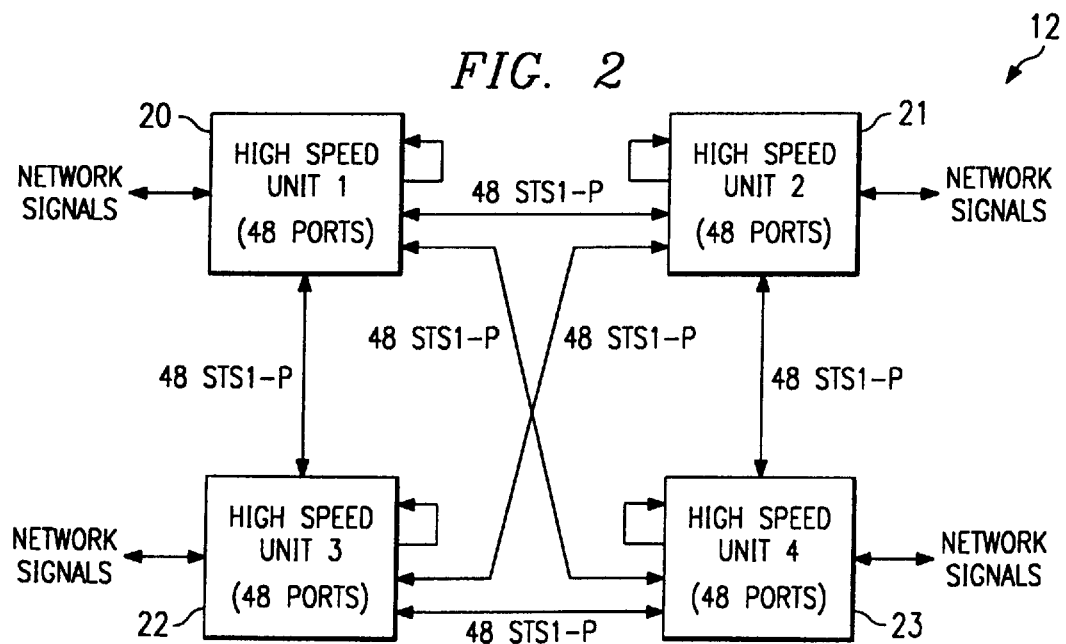
FIG. 2 is a simplified block diagram showing an embodiment of the interconnections between four high speed unit shelves to form a 192 port system.
Figure 3:
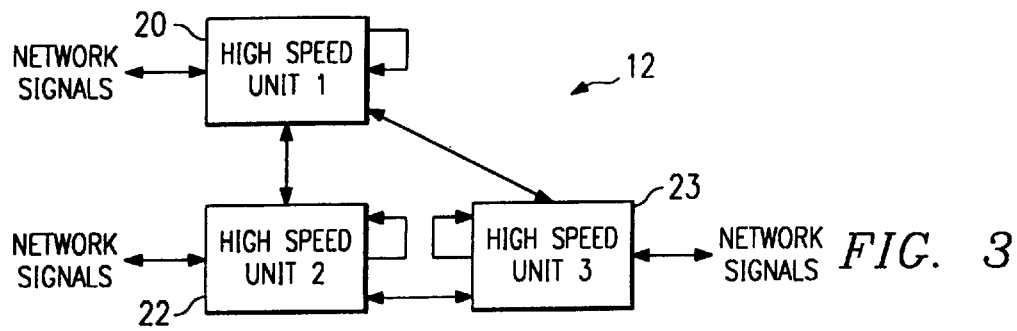
FIG. 3 is a simplified block diagram of a 144 port broadband digital cross-connect system.
Figure 4:
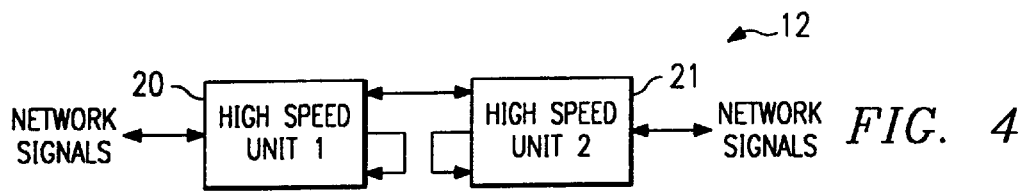
FIG. 4 is a simplified block diagram of a 96 port broadband digital cross-connect system.
Figure 5:
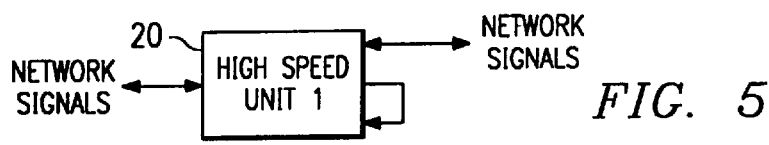
FIG. 5 is a simplified block diagram of a 48 port broadband digital cross-connect system.

FIGS. 2–5 show how high speed unit shelves 20–23 may be interconnected to form a broadband subsystem 12 to cross-connect signals on 192, 144, and 96 and 48 ports. For cross-connection of 192 signals, four high speed units 1–4 20–23 are interconnected in a manner as shown. For a 144 port system, as shown in FIG. 3, three high speed units 20, 22, and 23 are interconnected, each terminating 48 STS-1 signals. For cross-connection of 96 signals, two high speed units 20 and 21 are interconnected, as shown in FIG. 4. A 48-port broadband cross-connect system is shown in FIG. 5.

High speed units 20–23 are preferably co-located, so that electrical connections, rather than optical fibers, may be used to interconnect the units in a cost effective manner. Since broadband cross-connect system 10 is a two stage space full non-blocking cross-connect system, each STS-1 or STS-1P signal is routed through and switched by two matrices in the high speed units.

Figure 6:
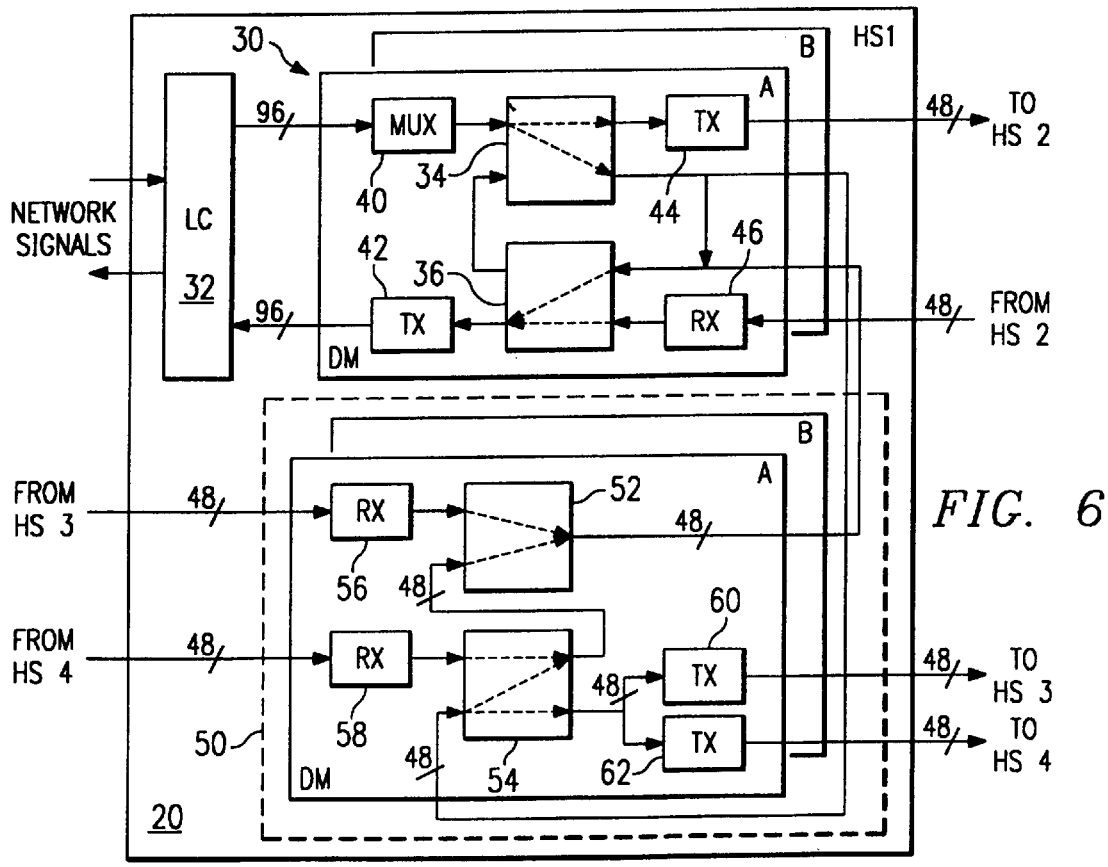
FIG. 6 is a more detailed block diagram of an embodiment of a high speed unit in a 192 port broadband digital cross-connect system.

Referring to FIG. 2 and FIG. 6 jointly, more details of a high speed unit 20 configured and interconnected in a 192-port broadband subsystem 12 is shown. As discussed above, the 192-port system includes a total of four high speed units 20–23 forming a two-stage fully non-blocking matrix architecture. Although FIG. 5 and the description hereinafter focus on high speed unit 20, they are equally applicable to the other units 21–23.

High speed unit 20 includes A and B copies of a digital matrix circuit (DM) 30 and a line card circuit (LC) 32. Each copy of digital matrix circuit 30 includes two matrices 34 and 36, which are two 96×96 crosspoint switches each capable of cross-connecting up to 96 STS-1P signals at the STS-1 rate. The two copies of digital matrix circuit 30 provides redundant backup and may be switched from one to the other in a seamless manner because both copies are operating simultaneously. Digital matrix circuit 30 further includes a multiplexer 40, transmitters 42 and 44, and receiver 46 for multiplexing, transmitting, and receiving signals from line card 32 and other high speed units. It may be seen that a portion of the output from matrix 34 is routed to the input of matrix 36, which is used for small system configurations in which digital matrix circuits 50 is not used. From matrix 36, a portion of the output is also routed to the input of matrix 34.

In the 96-port configuration, high speed unit 20 includes only one set of A and B copies of digital matrix circuit 30, which is connected to the digital matrix circuit of the second high speed unit 21. In the 192-port configuration, an additional set of digital matrix circuit 50 is included in high speed unit 20 for connection with high speed units 3 and 4 22 and 23. Similarly, digital matrix circuit 50 includes two 96×96 crosspoint switches 52 and 54, receivers 56 and 58 for receiving STS-1P data from high speed units 3 and 4, respectively, and transmitters 60 and 62 for sending STS-1P data to high speed units 3 and 4, respectively. Note that digital matrix circuits 30 and 50 are interconnected within the high speed unit 20. The output of crosspoint switch 52 is routed to the input of crosspoint switch 36 in digital matrix circuit 30. Some output from crosspoint switch 34 is routed to the input of crosspoint switch 54, from which some output is also routed the input of crosspoint switch 52.

In addition to cross-connecting STS-1P signals at the STS-1 rate, each high speed optical unit can terminate OC-3 or OC-12 optical signals or terminate a mixture of OC-3 and OC-12 optical signals. High speed optical unit provides an interface between the optical network signals and other high speed units. High speed optical unit 24 also monitors the quality of the data and inserts and extracts overhead data and provides protection switching when necessary. Each high speed optical unit includes an optical terminator (not shown) for terminating an appropriate optical signal. Optical terminator converts the optical signal into an electrical signal and the data is unscrambled and demultiplexed into internal STS-1P signals. High speed electrical units, on the other hand, provide termination of higher rate electrical signals such as DS-3.

Inbound data at an OC-3 rate received from the network optical domain at an high speed optical unit is received by an optical terminator which converts the optical signal to an STS-3 electrical signal, recovers clock and frame information, and checks the quality of the STS-3 signal. Next, the optical terminator unscrambles and demultiplexes the STS-3 signal into its three STS-1 component signals and checks the quality of each STS-1 signal. Overhead bytes are extracted and processed from each STS-1 signal and are multiplexed and sent to attached processors (not shown). Each STS-1 signal is pointer processed, the STS-1 synchronous payload envelopes (SPE) are extracted, and the STS-1 signal synchronous payload envelopes are mapped into an internal STS-1P signal.

Accordingly, a small broadband system with a flexible, and cost and space efficient configuration is provided by the present invention. The two stage non-blocking broadband cross-connect architecture is expandable from 48 ports to 192 ports.

Although the preferred embodiment has been described in detail, it should be understood that various changes, substitutions, and alterations can be made herein. Other examples are readily ascertainable by one skilled in the art and could be made without departing from the spirit and scope of the present invention as defined by the following claims.

What is claimed is:

1. A broadband cross-connect system in a telecommunication network, comprising:

a first high speed unit having a first digital matrix circuit that includes first and second crosspoint switches, the first crosspoint switch receiving and cross-connecting network signals from an element in the telecommunications network, the second crosspoint switch cross-connecting and providing network signals to the telecommunications network, the first and second crosspoint switches operable to cross-connect network signals to and from each other, the first crosspoint switch operable to provide network signals it has received back to the element in the telecommunications network from which the network signals were received; and an administration subsystem for providing centralized control and synchronization to said first high speed unit.

2. The broadband cross-connect system, as set forth in claim 1, further comprising:

a second high speed unit having a first digital matrix circuit that includes third and fourth crosspoint switches, said second high speed unit being interconnected with said first high speed unit, the third crosspoint switch receiving and cross-connecting network signals, the fourth crosspoint switch cross-connecting and providing network signals, the third and fourth crosspoint switches operable to cross-connect network signals to and from each other.

3. The broadband cross-connect system, as set forth in claim 2, wherein the first crosspoint switch cross-connects network signals to the fourth crosspoint switch and the third crosspoint switch cross-connects network signals to the second crosspoint switch.

4. The broadband cross-connect system, as set forth in claim 2, further comprising:

a third high speed unit having a first digital matrix circuit that includes fifth and sixth crosspoint switches, said third high speed unit being interconnected with said first and second high speed units, the fifth crosspoint switch receiving and cross-connecting network signals, the sixth crosspoint switch cross-connecting and providing network signals, the fifth and sixth crosspoint switches operable to cross-connect network signals to and from each other.

5. The broadband cross-connect system, as set forth in claim 4, wherein the first high speed unit has a second digital matrix circuit that includes a first crosspoint switch operable to receive and cross-connect network signals from the third high speed unit.

6. The broadband cross-connect system, as set forth in claim 5, wherein the first crosspoint switch of the second digital matrix circuit is operable to provide network signals to the second crosspoint switch of the first digital matrix circuit.

7. The broadband cross-connect system, as set forth in claim 4, wherein at least one of said first, second, and third high speed units has a plurality of ports for cross-connecting a multitude of signals.

8. The broadband cross-connect system, as set forth in claim 5, further comprising:

a fourth high speed unit having a first digital matrix circuit that includes seventh and eighth crosspoint switches, said fourth high speed unit being interconnected with said first, second, and third high speed units, wherein the seventh crosspoint switch receiving and cross-connecting network signals, the eighth crosspoint switch cross-connecting and providing network signals, the seventh and eighth crosspoint switches operable to cross-connect network signals to and from each other.

9. The broadband cross-connect system, as set forth in claim 8, wherein the second digital matrix circuit of the first high speed unit includes a second crosspoint switch operable to receive and cross-connect network signals from the fourth high speed unit.

10. The broadband cross-connect system, as set forth in claim 9, wherein the second crosspoint switch of the second digital matrix circuit is operable to provide network signals to the first crosspoint switch of the second digital matrix circuit.

11. The broadband cross-connect system, as set forth in claim 9, wherein the first crosspoint switch of the first digital matrix circuit is operable to provide network signals to the second crosspoint switch of the second digital matrix circuit.

12. The broadband cross-connect system, as set forth in claim 8, wherein each of said first, second, third, and fourth high speed units has 48 ports for cross-connecting a total of 192 signals.

13. The broadband cross-connect system, as set forth in claim 1, wherein said administration subsystem includes:
    an administration unit for generating control information to said first high speed unit; and
    a system timing subsystem for distributing timing information to said first high speed unit.

14. The broadband cross-connect system, as set forth in claim 13, wherein said system timing subsystem includes unit managers for receiving control information from said administration unit and distributing said control information to said first high speed unit.

15. The broadband cross-connect system, as set forth in claim 14, wherein said first high speed unit includes a plurality of unit controllers for receiving and processing said control information distributed by said unit managers.

16. The broadband cross-connect system, as set forth in claim 1, wherein the first high speed unit includes:
    a line card interface coupled to the first and second crosspoint switches and operable to receive and transmit network signals from and to network elements in the telecommunications network.

17. The broadband cross-connect system, as set forth in claim 7, wherein the first, second, and third high speed units each include 48 ports for cross-connecting 144 signals.

* * * * *